United States Patent
Hilbert et al.

(10) Patent No.: US 7,412,447 B2
(45) Date of Patent: Aug. 12, 2008

(54) REMOTE FILE MANAGEMENT USING SHARED CREDENTIALS FOR REMOTE CLIENTS OUTSIDE FIREWALL

(75) Inventors: David M. Hilbert, Palo Alto, CA (US); Jonathan J. Trevor, Santa Clara, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 469 days.

(21) Appl. No.: 10/790,402

(22) Filed: Mar. 1, 2004

(65) Prior Publication Data

US 2005/0192966 A1 Sep. 1, 2005

(51) Int. Cl.
G06F 17/30 (2006.01)
G06F 17/00 (2006.01)

(52) U.S. Cl. ..................... 707/10; 707/104.1

(58) Field of Classification Search ................ 707/100, 707/9, 10, 104.1; 709/217–219; 715/501.1
See application file for complete search history.

(56) References Cited

U.S. PATENT DOCUMENTS

| | | | | |
|---|---|---|---|---|
| 5,802,518 A * | 9/1998 | Karaev et al. | .................. | 707/9 |
| 6,016,478 A * | 1/2000 | Zhang et al. | .................... | 705/9 |
| 6,144,997 A * | 11/2000 | Lamming et al. | ............ | 709/217 |
| 6,212,640 B1 * | 4/2001 | Abdelnur et al. | ................ | 726/2 |
| 7,139,811 B2 * | 11/2006 | Lev Ran et al. | ............. | 709/217 |
| 2002/0161860 A1 * | 10/2002 | Godlin et al. | ............... | 709/219 |
| 2002/0178271 A1 * | 11/2002 | Graham et al. | .............. | 709/229 |
| 2003/0088570 A1 * | 5/2003 | Hilbert et al. | ............... | 707/100 |
| 2004/0255048 A1 * | 12/2004 | Lev Ran et al. | ............. | 709/249 |

OTHER PUBLICATIONS

BSCW, "BSCW in practice," www.bscw.de, Dec. 2003, 1 p.
InfoClarus, "Mobile Office Companion Suite," www.infoclarus.com, Dec. 2003, 1 p.
InfoClarus, "ActiveNet Document Companion," www.infoclarus.com, Aug. 2003, 2 pp.
INfoClarus, "ActiveNet File Companion for Web," www.infoclarus.com, Jun. 2003, 3 pp.
InfoClarus, "ActiveNet Internet Mail-File Companion," www.infoclarus.com, Aug. 2002, 3 pp.
InfoClarus, "ActiveNet Conversion Companion," www.infoclarus.com, Jun. 2003, 3 pp.
InfoClarus, "ActiveNet OWA Companion," www.infoclarus.com, Jun. 2003, 3 pp.
Xdrive, Inc., "How it Works," www.xdrive.com, Oct. 2003, 2 pp.
U.S. Appl. No. 10/777,289, filed Feb. 11, 2004, David M. Hilbert et al.
U.S. Appl. No. 10/777,571, filed Feb. 11, 2004, David M. Hilbert et al.

(Continued)

*Primary Examiner*—Uyen T. Le
(74) *Attorney, Agent, or Firm*—Fliesler Meyer LLP

(57) ABSTRACT

An access server allows secure access to commonly used files stored on multiple file sources from a variety of client devices. The access server extracts a list of file sources associated with the user, and accesses each of those sources. The server is then configured to extract a list of most recently used files by the current user as well as information associated with those files. The access server also processes electronic mail attachments. The access server intercepts electronic mail messages containing attachments, and transmits the attachments to a file server.

54 Claims, 13 Drawing Sheets

OTHER PUBLICATIONS

U.S. Appl. No. 10/828,991, filed Apr. 21, 2004, David M. HIlbert et al.

Cisco Systems, Inc., "Cisco VPN 3000 Series Concentrator," Feb. 5, 2004 (downloaded from http://www.cisco.com/warp/public/779/largeent/learn/technologies/VPNs.html), pp. 1-9.

FileWay, "FileWay™: A Secure, Web Based File Access Solution," white paper, Oct. 3, 2003 (downloaded from http://www.fileway.com/), 10 pp.

Fuji Xerox Co., Ltd., "Fuji Xerox Launches ArcSuite Web-Based Integrated Information Management System," Nov. 26, 2002 (downloaded from http://www.fujixerox.co.jp/eng/headline/2002/1126arcsuite.html), 3 pp.

FusionOne, "BREW Wireless Internet Application—MightyBackup," Feb. 7, 2004 (downloaded from http://www.fusionone.com), 1 p.

Halpern, Jason, et al., "SAFE VPN IPSec Virtual Private Networks in Depth," Cisco Systems, Inc., Sep. 8, 2002 (downloaded from http://www.cisco.com/warp/public/779/largeent/learn/technologies/VPNs.html), pp. 1-96.

InfoStreet, Inc., "Welcome to Infostreet—Deployment Methods," Jan. 29, 2004 (downloaded from http://www.infostreet.com), 1 p.

InfoStreet, Inc., "Welcome to Infostreet—Features—Corporate File Sharing," Jan. 29, 2004 (downloaded from http://www.infostreet.com), 1 p.

InfoStreet, Inc., "Welcome to Infostreet—Solutions—Extranets," Jan. 29, 2004 (downloaded from http://www.infostreet.com), 2 pp.

Microsoft Corporation, "Microsoft Windows 2000 Server—Virtual Private Networking in Windows 2000: An Overview," white paper, Sep. 4, 2001 (downloaded from http://www.microsoft.com/windows2000/technologies/communications/vpn/), pp. i-iii, 1-24.

Motivus, "Motivus Wireless Desktop Server V2.0—Empower Your Wireless Devices," Review Date Jul. 1, 2001, PC Magazine, Ziff Davis Publishing Holdings Inc. (downloaded from http://www.motivus.com), 6 pp.

Nortel Networks, "Mobilizing—Nortel Networks Mobilizing your VPN," Solution Brief, 2004, (downloaded from http://www.nortelnetworks.com/solutions/ip_vpn/), pp. 1-5.

Richardson, Tristan, et al., "Virtual Network Computing," IEEE Internet Computing, vol. 2, No. 1, Jan./Feb. 1998, pp. 33-38.

Trevor, Jonathan, et al., "Issues in Personalizing Shared Ubiquitous Devices," In Proceedings of the 4th International Conference on Ubiquitous Computing (UbiComp 2002), 15 pp.

Xerox Corporation, "Xerox Teams with GoAmerica, Enabling Workers to Travel Light with Enhanced Wireless Software Application," Xerox Newsroom, Apr. 30, 2001, New York, 2 pp.

Xerox Corporation, "the most intuitive way to capture, manage and share documents and content,"Xerox DocuShare 3, Sep. 2003, (downloaded from http://www.xerox.com/go/xrx/equipment/product_details.isp?prodID=DocuShare), 8 pp.

Xythos® Software, Inc., "Simple document and file management—Products, WebFile Client," 2003, Xythos Software Inc., San Francisco, CA, 3 pp.

Citrix Systems, Inc., "GoToMyPC: Making Life Simpler for Remote and Mobile Workers," Citrix Online Division, (downloaded from https://www.gotomypc.com/), pp. 1-7, date unknown.

F5 Networks, Inc., "Secure Remote Access," Datasheet, FirePass® Series, 2004 (downloaded from http://www.uroam.com/ 6 pp., date unknown.

* cited by examiner

REMOTE FILE MANAGEMENT USING SHARED CREDENTIALS FOR REMOTE CLIENTS OUTSIDE FIREWALL

FIELD OF THE INVENTION

The current invention relates generally to remote file management and particularly to systems and methods for enabling access and transfer of remote files.

BACKGROUND OF THE INVENTION

In the present business environment users are increasingly dependent on access to electronic documents and other files for performing regular business functions. Historically, users stored files upon their local machines and when traveling stored the files on portable media. However, this practice was less than ideal as it did not allow multiple users to simultaneously access the newest version of a file, the size of the physical media limited the types of files that could be used, and the physical media were often unreliable.

As networking technology became more easily accessible, some solutions arose to allow users to access their files away from their home or work computers. Several operating systems enabled users to access files stored on remote networks through Internet gateways or TCP/IP enabled file sharing. However, security concerns often limited the usability of such solutions. In order to preserve the vital integrity of the files stored on local networks, such solutions often require users to employ client side Virtual Private Networking (VPN) connections to allow secure access to their remotely stored files. While VPN provides a tolerable level of protection to the remotely stored files, it presents a number of significant difficulties.

Firstly, configuring a client to use VPN requires both administrator level access to the client machine and a lengthy setup procedure. For situations where users wish to access their files from public machines such as those at a retail business center or an Internet cafe, this proves to be an intolerable inconvenience. Additionally, many client devices that have entered the market during the past few years such as data-ready cellular phones and Personal Data Assistants (PDA), lack robust support for VPN. Furthermore, VPN typically only allows access to one private network at a time, requiring users that seek to access multiple secure networks to disconnect from the first network before accessing the second network, rather than enjoying simultaneous access to both networks.

What is needed is a solution that allows users easy and secure access to important files on a variety of file sources.

SUMMARY OF THE INVENTION

An access server allows secure access to commonly used files stored on multiple file sources from a variety of client devices and secure transfer of those files through an integrated mail client. The access server stores user identification and password information for multiple file sources. The access server is connected to multiple file sources across a Local Area Network (LAN) or Wide Area Network (WAN). Additionally, the server maintains a web gateway for access by client devices.

Upon receiving a login request from a user, the access server extracts a list of file sources associated with the user, and accesses each of those sources. The server contacts each source and submits identification and password information associated with each source. The server is then configured to extract a list of the most recently used files by the current user as well as information associated with those files. The server presents to the user an interface including links to his most recently used files.

The server also includes functionality for transmitting messages with large file attachments to size limited recipients. Embodiments of the present invention accept electronic mail messages containing attachments and transmit the attachments to a file server. A message parser removes the file attachments from the messages and inserts hypertext links, executables, or data files directing the recipient to the copy of the attachment stored on the file server.

DETAILED DESCRIPTION

Users often store documents such as memos, spreadsheets, and presentations on networked file servers in their homes or offices.

Figure 1:
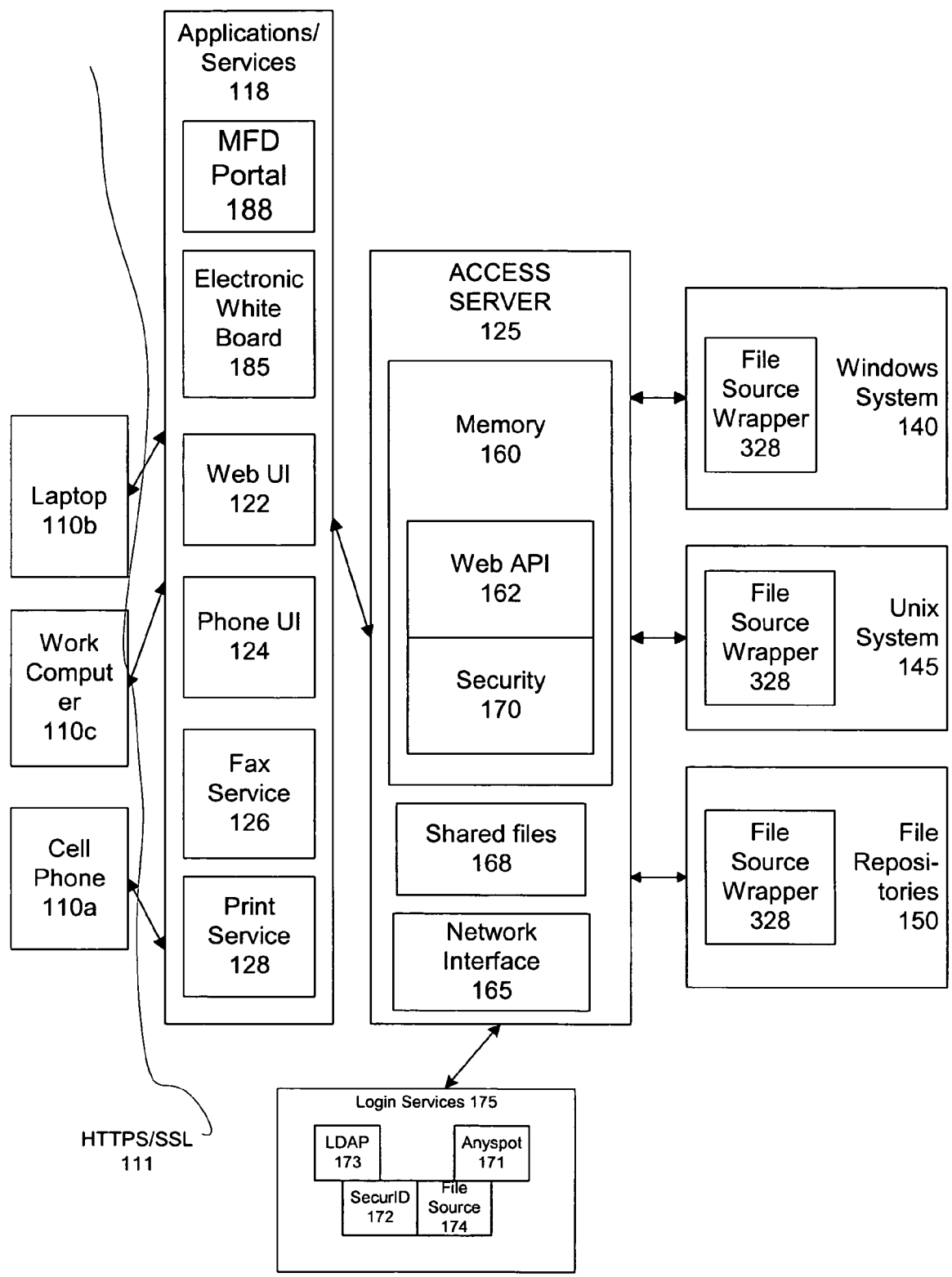
FIG. 1 illustrates the interaction among clients, file sources, and an access server in accordance with one embodiment of the present invention.

FIG. 1 illustrates the interaction among clients, file sources, and an access server in accordance with one embodiment of the present invention. An access server 125 is in communication with a group of file sources 140, 145, 150 and a client system 110. The access server 125 is a server having memory 160, and a network interface 165 that is configured to enable secure access to the file sources 140, 145, 150 from the client system 110.

The file sources 140, 145, 150 include a Windows system 140, a Unix System 145, and file repositories 150. While these three file source types are represented herein, virtually any system which is networked and stores data may be used. All three file sources include a file source wrapper 328. The file source wrapper 328 is a module which is configured to manage interaction with the access server 125. The file source wrapper 328 periodically gathers lists of recently used files to present to the access server 125 when it contacts the file source. The Windows System 140 is an individual system or server which runs the Microsoft Windows operating system. The Unix system 145 runs a variant of Unix such as Linux, Solaris, or any other available variant. The file repositories 150 are specialized servers that provide remote access to files and may run any operating system.

The access server 125 accesses the file sources 140, 145, 150 via its network interface 165, through a LAN, WAN, or customized dialup connection. The access server 125 may be located behind whatever firewall protections the file sources may use. Alternately, the access server 125 may use VPN, Extensible Markup Language(XML), Simple Object Access Protocol(SOAP) or a customized connection mechanism to reach the file sources 140, 145, 150. The connection mechanism is preferably modular and thus transparent to the client system 110. The access server includes a web API 162 that can be accessed by the clients 110 using HTTP. The access server 125 also maintains a set of shared files 168. The shared files 168 are files that are made available by one user of the access server for use by other users. The shared files may also be stored on the file sources 140, 145, 150. The access server also includes a security module 170 which controls secure access between the file sources and the clients.

The client system 110 is a device remote to the access server 125 used to access, manipulate, print, and/or view the files stored on the file sources 140, 145, 150. The client 110 can be a personal computer, personal data assistant, or any device having file-viewing capacity. The client system 110 establishes a secure network connection such as a HyperText Transport Protocol Secure/Secure Socket Layer connection between itself and the access server 125 through a firewall 111 and views the files on the file sources 140, 145, 150 through an application/service 118 interface maintained by the access server or generated by the client itself. This interface can be a web interface or any other interface. In one embodiment, the applications/services 118 are included on the same server as the access server 125. In an alternate embodiment, the applications/services are located on a separate server.

The applications/services 118 include a web User Interface (UI) 122 that enables a client system to access the access server through a conventional web browser. The applications/services 118 also include a phone UI. The phone UI is an application that generates a web interface suitable for Internet-enabled cell phones that allows users to email, fax, or print files stored on the access server or file sources. Alternatively the phone UI 124 is a program connected to a conventional telephone network which allows a user to copy and print files stored on the access server 125 or file sources 140, 145, 150 by calling a predetermined number and submitting the appropriate requests. The applications/services also include a fax service 126 that is connected to a conventional phone network and enables the faxing of files stored on the files sources 140, 145, 150 upon request from one of the clients 110. The print service 128 is connected to a remote printer or network and accepts print requests for files stored on the access server 125 or the file sources 140,145,150. The applications/services also include a multifunction device portal 188. The multifunction device portal 188 manages interaction with networked multifunction devices that include scanning, printing, imaging, and copying functionality. The applications/services 118 also include an electronic whiteboard portal 185 that allows the access server to interact with electronic whiteboard systems and allows multiple users to collaborate through electronic white boards. The applications/services 118 can use SOAP/XML to connect to the access server 125 or alternately, another connection mechanism.

While in the present embodiment, the fax service 126, print service 128, whiteboard portal 185 and multifunction device portal are stored inside the firewall, in alternate embodiments, these services are stored outside the firewall and interact with the access server 125 through an HTTPS/SSL connection like the client devices 110.

Additionally, the access server can store proxy representations of files stored on the file sources 140, 145, 150 that are configured to allow sharing of files stored on the file sources. A first user can submit a share request to the proxy server which includes a location of the file or group of files and an identity of a second user who will be permitted to access and/or modify the file or group of files. In some embodiments, a client of the proxy server 125 can integrate with the operating system software of the file source to allow a user to transparently share files with remote users through an interface similar to that used for local sharing. In an alternate embodiment, the access server receives the share request through the web UI, phone UI, or a custom interface. In yet another embodiment, the share request may be generated as a result of the first user attempting to send a file attachment to a second user.

The access server then generates a proxy representation for the file, the proxy representation including an identifier for the file or group of files, the file source on which the file or group of files is stored, a path and filenames on the file source for the file or group of files, credentials for the file source that belong to the first user and enable the second user to access and/or modify the files, a permissions indicator listing an identifier of the second user and his level of access(read/write), and an optional location on the access server 125 where cached versions of the file are stored. If the first user has previously shared the files, the access server can modify the permissions indicator of the existing proxy representation to add the second user as authorized to access and/or modify the file or group of files.

If the second user does not already have an account on the access server, the second user can register himself with the access server through an email registration process. Thus, the first user can share files with a second user who has not yet created an account on the access server. Once the second user has completed the registration process, he can access all the files that have been shared with him prior to his registration.

When the second user accesses the shared file, the access server 125 allows him to access the cached version, if it exists. Otherwise, the access server uses the credentials and location information stored in the proxy representation to retrieve the file from the file source. If the second user has write access and makes changes to the file, the access server 125 uses the stored credentials to log into the file source and change the original version of the file stored on the file source.

The login services 175 are a set of modular authentication services that can be used to authenticate a user for the access server 125. When a user first sets up an account with the access server the user determines which of the login services 175 will be used to authenticate the user and provides a username that the access server 125 can use with the designated login service. When the user tries to login, the access server determines which login service is to be used for authentication and replaces the user's login username for the access server with the previously provided username established earlier. The access server uses the same credential with the mapped username to log into the login service 175 when the user tries to log into the access server 125. If the access server can successfully log into the login service with the provided credentials, then the user is authenticated. The login services include an internal AnySpot login service 171 which is maintained by the access server 125 a well known Lightweight Directory Access Protocol (LDAP) directory 173, a login service 174 maintained by one of the file sources themselves in which authentication is verified by logging into the file source 140, 145, 150, and a securID server 172.

Figure 1A:
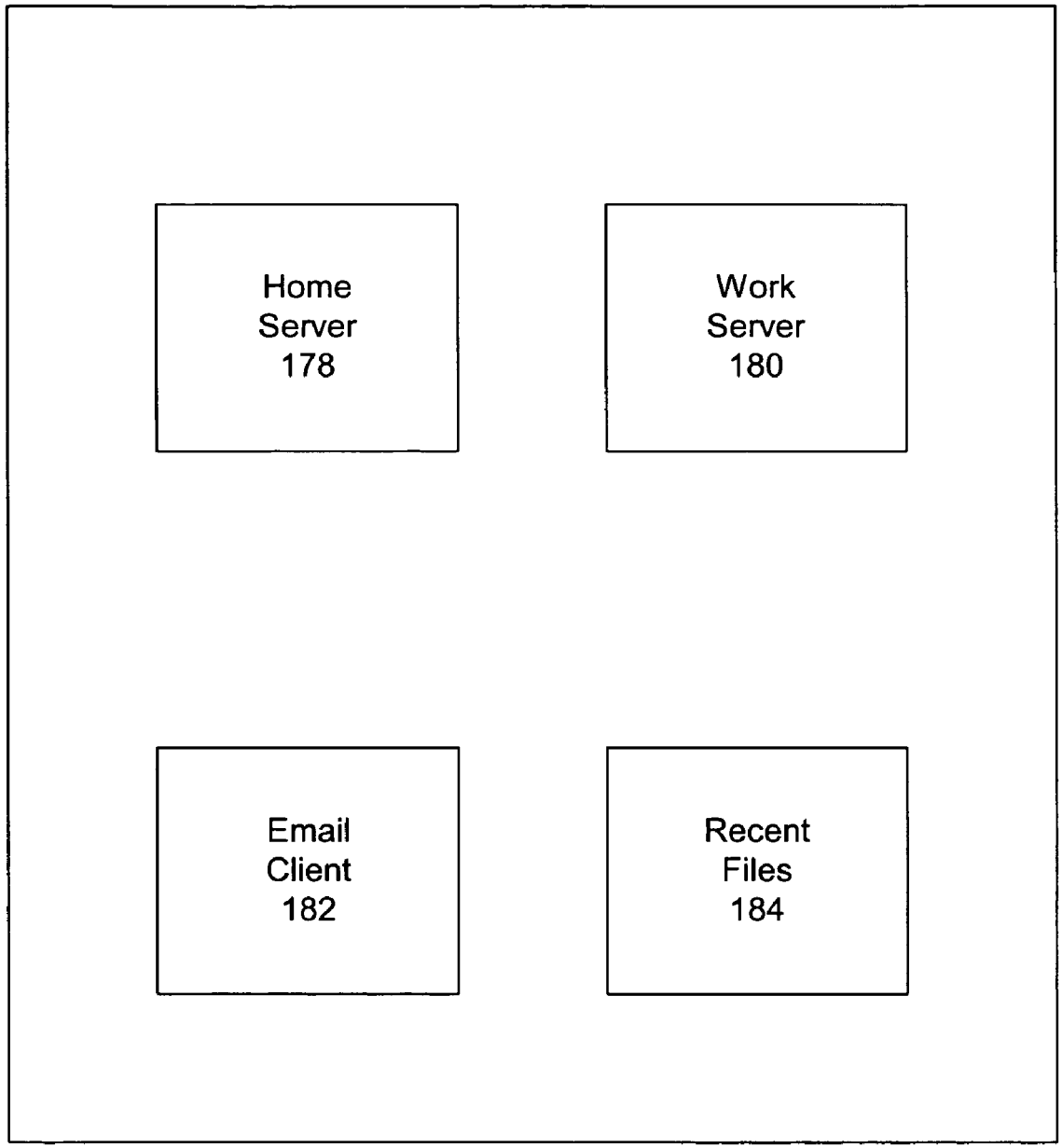
FIG. 1A illustrates an interface generated by an access server.

FIG. 1A illustrates an interface 170 generated by an access server 125. The access server presents the interface as web page to a client system 110, which displays it on a local display. The interface shown would appropriately be displayed on a desktop or laptop, with modified versions of the interface for clients such as cell phones. The interface 170 includes icons for accessing various file sources, such as a home server 178, and a work server 180. The icons usually link to user directories on the various file sources. The interface 170 additionally includes a link to an email client, from which a user can receive and transmit mail messages, including messages attaching content stored on the file sources. The interface 170 also includes an icon 184 linking to new and recently accessed files. Selecting the icon will present the user with links to recent files selected from the user's file sources, files the user has shared with others, and files shared by others with the user. If the user does not have file sources associated with his account on the access server 125, the links will include only files shared by other users. For those files shared with other users, the list interface may also indicate whether other users have modified the file recently. By selecting the links the user can share copies or original versions of the files or route the files to external sources such as printers, fax services, or any other service associated with the access server 125. A similar interface may also be generated for custom devices such as multifunction devices and electronic whiteboards so that users can access their files through these shared devices.

The interface 170 is configurable and can be directed to display icons directed towards particular locations on the file sources.

Figure 1B:
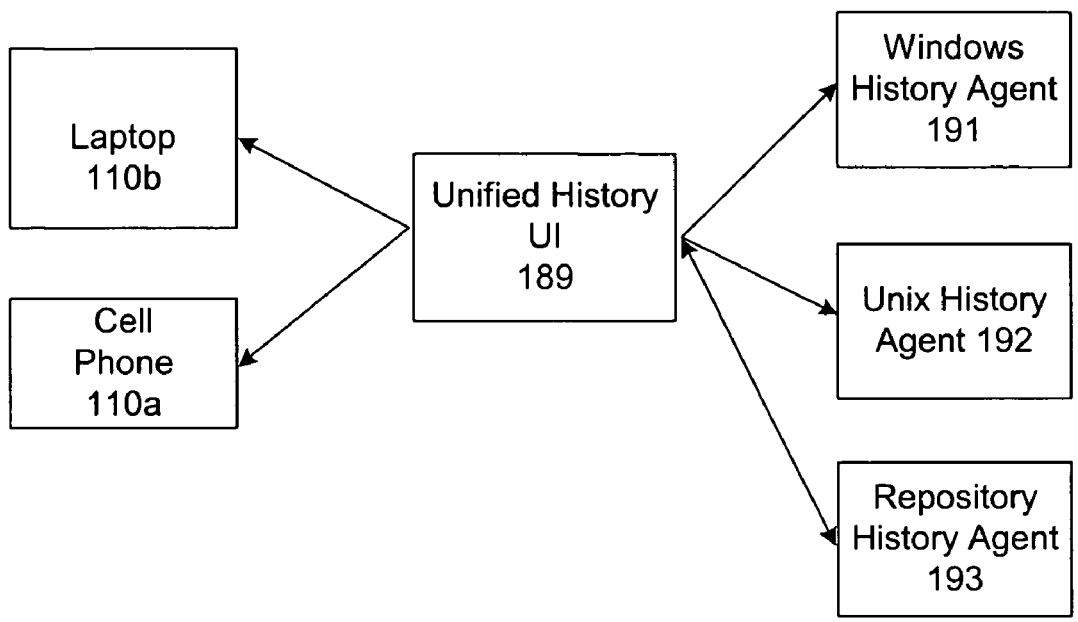
FIG. 1B illustrates a functional overview of a remote access system.
Figure 1B:
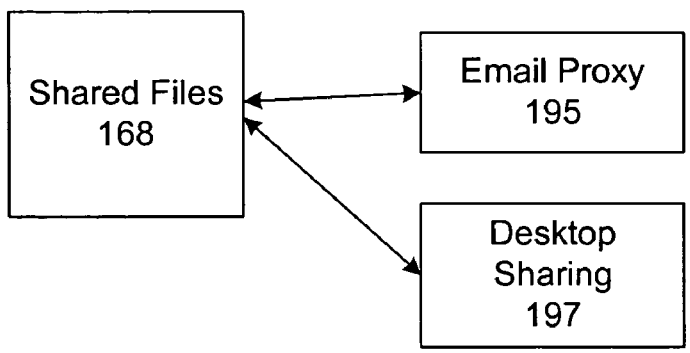
Figure 1B:
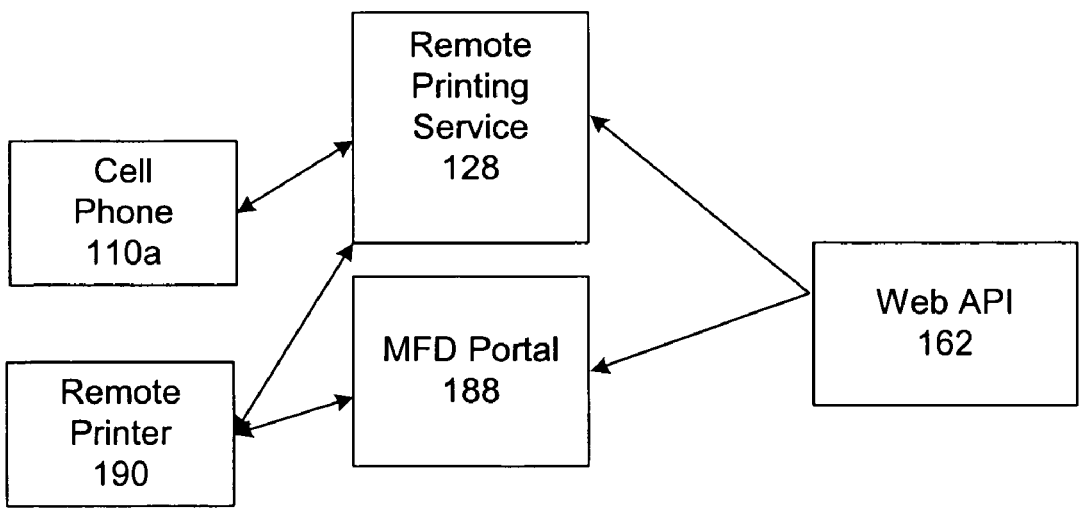

FIG. 1B illustrates a functional overview of a remote access system. The system described below is functional and is not intended to imply a particular structure for the collected program functions. A unified history UI 189, preferably stored on the access server 125 maintains contact with Windows 191, Unix 192, and repository 193 agents, preferably stored on the Windows System 140, the Unix System 145, and the file repository 150 respectively. The history agents maintain lists of frequently used and favored files, which are then gathered by the unified history UI. The Unified History UI provides a list of the files selected by the agents to the clients.

The shared files 168 stored on the access server are in communication with an email proxy 195 and desktop sharing module 197. The email proxy allows a user of the access server to embed a link, data file, or executable enabling the retrieval of the shared files 168 in an outgoing email message. A desktop sharing 197 module allows a user of the access server to share files stored on the access server 125 or his personal desktop with a remote user.

The access server maintains contact with the remote printing service 128 and transmits requests to print documents stored on the file sources or among the shared files 168 on the remote printer 190. This allows mobile users with a web phone or other web browsing device to print their personal documents on a remote printer. Alternately, users can access the remote printer 190 through the multifunction device portal 188 which may be collocated with a remote printer and which communicates with the access server using the web API 162 of the access server. The multifunction device portal 188 manages access to multifunction devices and accepts imaging and scanning information from the multifunction devices and transmits print requests to the multifunction devices. The multifunction device portal communicates with the access server web API to allow mobile users to print their personal documents, fax to their personal contacts, and scan to their desktop using the remote printer.

Figure 2:
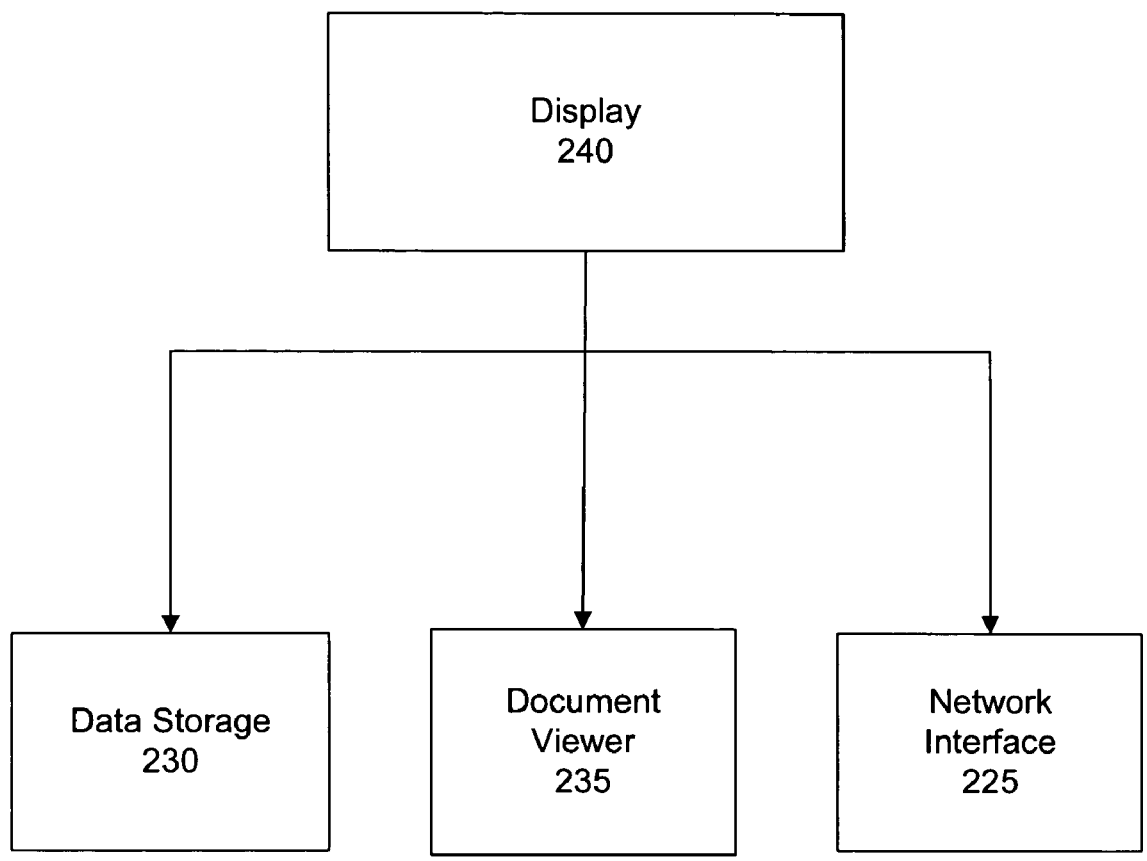
FIG. 2 is a closer view of a client system in accordance with one embodiment of the present invention.

FIG. 2 is a closer view of a client system 110 in accordance with one embodiment of the present invention. The client device 110 includes data storage 230, a document viewer 235, and a network interface 225. The data storage 230 stores documents and other necessary data locally on the client system 110. The data storage can be a solid state device such as a hard drive. Alternately the data storage can be Static Random Access Memory(SRAM) or Dynamic Random Access Memory (DRAM).

The network interface 225 manages communication between the client device 110 and remote systems. The network interface 225 includes hardware communication devices such as a modem, Ethernet, or WiFi communicator as well as software protocols for managing communication.

The document viewer 235 parses documents received via the network interface 225 and presents them upon the display 240. The document viewer 235 preferably includes the ability to interpret HTML as well as most conventional document formats (Microsoft Word, Microsoft Excel, etc.) In one embodiment, the document viewer 235 is an application selector routine, that upon receiving a file across the network interface 225, determines a preferred application for viewing the file type and submits the file to the appropriate application, which then displays the document on the display 240. The document viewer can be a standardized application such as a web browser or an application specially configured for use with the access server 125. In an alternate embodiment, the document viewer 235 is a single application capable of displaying multiple file formats which independently receives and displays any received documents. In some embodiments, the document viewer 235 includes functionality for editing any received documents and either storing them in the data storage 240 or transmitting them back to the access server 125.

In some embodiments, the client system 110 is not configured to actually view files maintained by the access server 125. For example, if the client system 110 were a cell phone without significant display functionality, the client system could instruct the access server to email, fax, or copy the files to remote locations, direct the access server to print them at remote printers, or perform other functions, but not actually view the files themselves.

In some embodiments, the access server 125 or the client itself provides filters to recently used file lists according to the capacities or primary uses of the client 110. For example, if the client 110 were used primarily to generate video presentations, the file source wrapper would generate a list of the most recently used video presentation. Alternately, if the client couldn't view Microsoft Word documents or files larger than a predetermined size, the access server 125 or client itself 110 could filter larger files or Microsoft Word documents.

Figure 3:
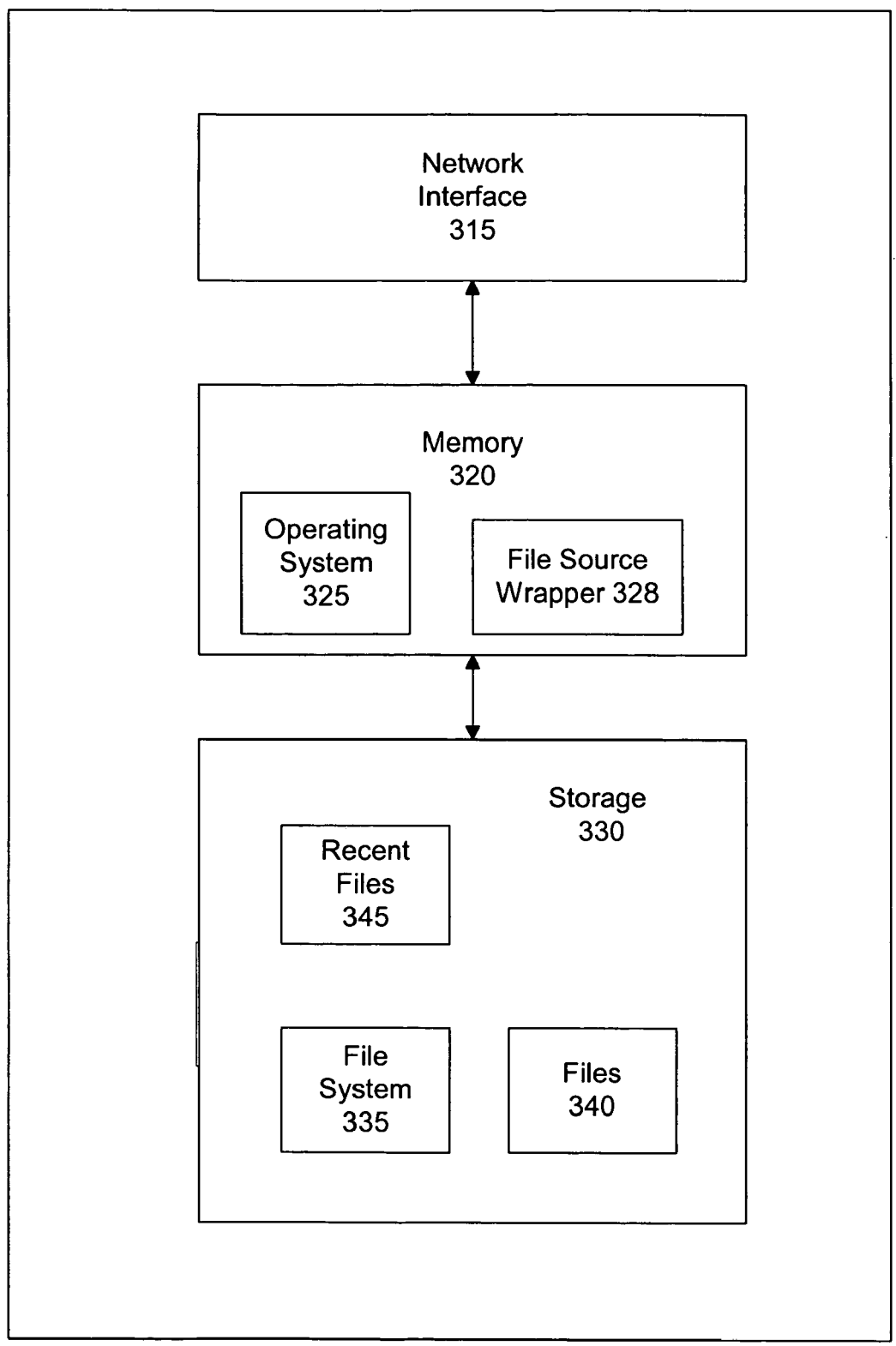
FIG. 3 is a closer view of a file source in accordance with one embodiment of the present invention.

FIG. 3 is a closer view of a file source 140 in accordance with one embodiment of the present invention. The file source preferably includes a network interface 315, a memory 320, and a storage 330. The file source can be a personal computer, a file server, or a public use computer.

The network interface 315 maintains communication between the file source 140 and any devices attempting to access the storage 330. The network interface can be an Ethernet connection, modem, WiFi transmitter, or any hardware capable of communicating with outside devices.

The memory 320 stores data in temporary use and maintains the operating system 325 which regulates access between the storage 330 and the network interface 315. The operating system 325 can include user identifiers and passwords which are used to regulate access to the storage 330. In one embodiment, the operating system 325 maintains an account for at least one user and restricts access to certain sections of the storage 330 to that user.

The storage 330 includes a file system 335 which maintains organizational information for the files 340 stored on the storage 330. The file system 335 maintains a directory structure, a time of last use for each of the files 340, access permissions for each of the directories 340, and all other information needed to properly manage access to the files 340 by the operating system 325.

The storage also includes a list of recently accessed files 345, which is maintained by the operating system 345. In one embodiment, the recent files 345 are a list of the files most recently accessed, modified, or created by the operating system 325. In an alternate embodiment, the operating system 325 maintains a separate recent file list 345 for each application which is run upon the system. For example, the operating system could maintain a list of the files most recently used by Microsoft Word, a separate list of the files last used by Adobe Acrobat, and a third list of the files last used by the Windows Media Player. The number and details of the lists 345 are governed by the complexity of the operating system 325.

In one embodiment, the file source 140 includes a file source wrapper 328. The file source wrapper 328 is a module which is configured to manage interaction with the access server 125. The file source wrapper 328 periodically gathers lists of recently used files to present to the access server 125 when it contacts the file source. The file source wrapper may draw the list from the operating system 325 or check lists maintained by different applications on the file source 325 and unify them to a single file list. In some embodiments, a single file wrapper 328 acts as a gateway for a number of file sources behind a firewall.

Figure 4:
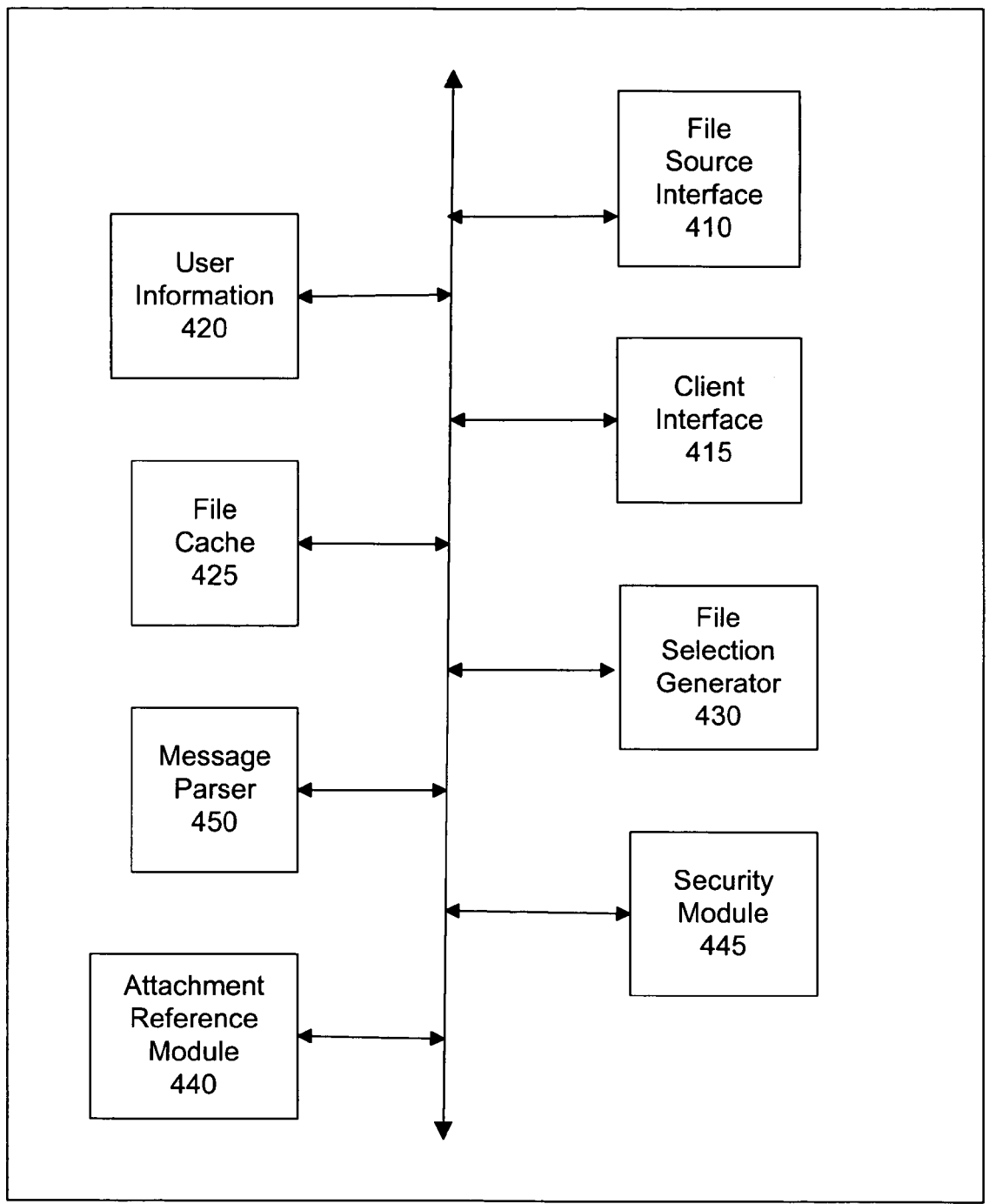
FIG. 4 is a closer view of a memory of an access server in accordance with one embodiment of the present invention.

FIG. 4 is a closer view of the memory 160 of an access server 125 in accordance with one embodiment of the present invention. The memory 160 includes a number of modules, specifically, a file source interface 410, a client interface 415, user information 420, a file cache, 425, a file selection generator 430, a message parser 450, an attachment reference module 440, and a security module 445 each of which provides some functionality for the access server 125. The modules can be hardware, software, firmware, or any combination thereof.

The user information 420 stores customized user information for each of a number of users of the access server. The user information 420 stores a list of sources for each user, a list of usernames and passwords for each source, and a list of recent files associated with each source.

The file source interface 410 manages interaction between the access server 125 and the file sources 140, 145, and 150. The file source interface 410 can include a standardized API that interfaces with the file source wrappers 328 on the file sources through a single standardized API provided by each of the file source wrappers, or customized front ends that are configured to interface with the file sources. The file source interface 410 is configured to receive general access instructions from the other modules and translate them to the format of the file source 140, 145, 150. For example, upon receiving a request for a file owned by user A and located on a Linux server, the file source interface would log into the Linux server, submit user A's ID and password information, log into the Linux server, navigate to the correct directory, and retrieve the file to the access server 125. Alternately, it could send the request to the file source wrapper located on the file source, which would itself locate the file and transmit it.

The client interface 415 generates a customized interface for the client system 110. This interface preferably includes a listing of recently used files, and the ability to view and edit the files, either through capacities internal to the interface or by utilizing file viewers on the client system 110 itself. The client interface 415 receives commands from the client, translates them and passes them to the appropriate module. In one embodiment, the interface generated by the client interface 415 is a standard HTML interface. In an alternate embodiment, the client interface, upon initially being contacted by the client system, 110, determines its identity and capacities, and selects the interface best suited for the client system. For example, if the client system 110 were a cell phone, the client interface would generate a low bandwidth interface. In some embodiments, the access server 125 provides a standardized API for interacting with the file list and files, and the client 110 is responsible for generating an interface based on information returned from the access server 125.

The file cache 425 stores locally available versions of files that are accessed by the access server 425. When a file is first accessed, the file source interface 410 retrieves the file from the file source 140. Any changes are stored in the local file cache 425. When a user attempts to view a file, the file is transferred from the file source 140 to the file cache. In one embodiment, when a session closes, the access server 125 evaluates the cache 425 to determine if any files have been changed. Any changed files are transferred back to the file source 140. In an alternate embodiment, changed files are continuously updated on the file source 140. For example, if one of the file sources was a laptop or another intermittently connected source, the access server would check all cached files to determine whether any had changed since the last connection, and update them on the file source 140.

The file selection generator 430 contacts each of the file sources 140, 145, 150 in order to generate a list of recently used files for each user. The recently used files may comprise lists of recently accessed, recently modified, or recently created files. In one embodiment, the file selection generator 430, through the file source interface 410, contacts each of the sources to receive lists of the most recently used files 345. The file selection generator 430 can draw a single list of the most recently generated files. Alternatively, the file selection generator 410 can extract a separate list of the most recently used files for each of a number of commonly used applications. For file sources that have file source wrappers, the files source wrapper generates the list and provides the list to the access server.

Some file sources 140 do not maintain separate lists of commonly used files. For these file sources, the file selection generator 430 checks the file system 335 of the file source 140 to determine which files were last accessed. Alternatively, the file selection generator can query the file source to determine which files were last modified or created. In some embodiments, the work of gathering and generating lists of recently used files is performed by the file source wrapper 328 which resides on the file source.

The number and type of files that are selected and received as recently used files can be universal, or configured separately by each user.

A message parser 450 is configured to receive messages with attachments, remove and transfer file attachments, and insert links, executables, and data files. The message parser 450 analyzes the message and according to the rules listed in the user preferences, determines whether and how the attachments should be removed. The message parser 450 then transmits any separated attachments to a remote attachment server configured to store and serve attachments. An attachment reference module 440 detects the transmission of the file to the file server and generates links, executables, or data files corresponding to the location or receives parameters for configuring the link, executable, or data file from the attachment server. In an alternate embodiment, the attachment server generates the link, data file, or executable and message parser 450 retrieves the links, data files, or executables and embeds them in the message. In one embodiment, when a message includes multiple attachments, the message parser 450 may insert a link, data file, or executable associated with a location storing the multiple attachments.

A security module 445 is configured to embed security protections in the message. The security module 445 installs tokens or other identifiers in the message that enable the recipient of the message to retrieve files from the remote server. Additionally, the security module 445 can contact the attachment server and instruct it to store the attachment in a location corresponding to complex and hard to reproduce URL, or to require credentials such as a security certificate, an authorized mail address, or a password before allowing access to the attachment.

Figure 5:
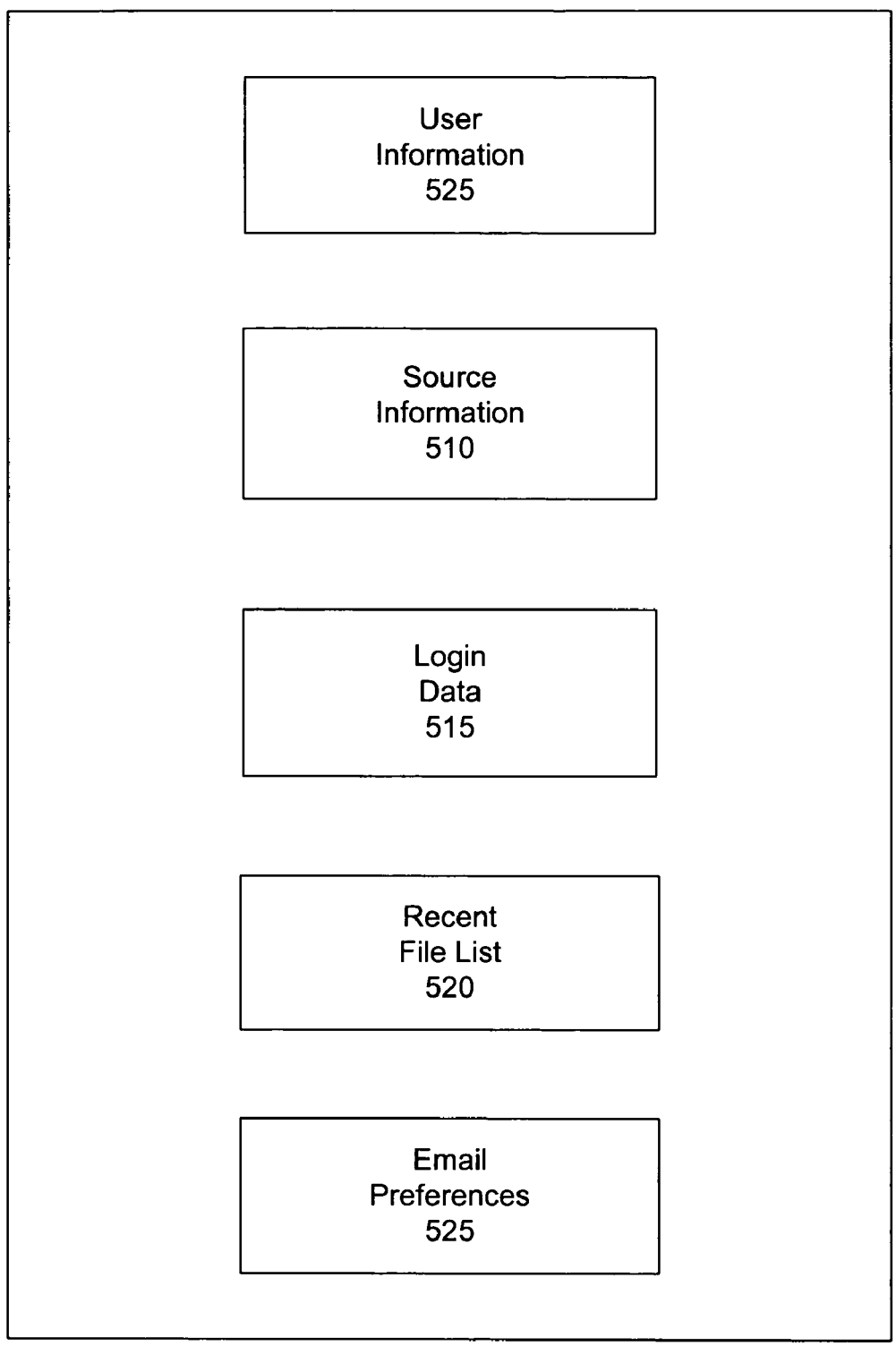
FIG. 5 is a closer view of a user file record in accordance with one embodiment of the present invention.

FIG. 5 is a closer view of a user file record 500 stored in accordance with one embodiment of the present invention. The file record 500 is usually stored in the user information 420. Typically, the user information 420 includes multiple records, each record associated with a user.

The user record 500 includes user identification 525. The user identification 525 includes information used to identify the user. Upon receiving a successful login from a user, the access server 125 searches the user identification 525 sections of each user record 500 until it finds a user ID corresponding with the submitted login information.

The source information 510 stores an identifier for each of the file sources 140, 145, 150. The identifier can include the Internet Protocol (IP) address, hostname, or any other usable identifier. This information is used to make contact with the file sources 140, 145, 150. Additionally, the source information 510 stores the operating system and computer type for the file sources 140, 145, 150. This information is utilized by the file source interface 410 to determine how to access and navigate the file sources 140, 145, 150.

The login data 515 stores usernames and passwords for each of the file sources 140, 145, 150 listed in the source information 510. The file source interface uses this information to access the file sources 140, 145, 150. In some embodiments, the access server 125 does not maintain usernames and passwords for all file sources and instead prompts the user for credentials when accessing the file source 140.

The recent file list 520 is a list of the files most recently accessed by the user. The recent file list is periodically updated by the file selection generator 430. In one embodiment, the recent file list 520 is updated whenever the user logs into the access server 125.

An email preferences file 525 stores preferences governing the transmission of email messages for the user. The email preferences file 525 indicates when and how message attachments are separated from outgoing mail messages.

Figure 6:
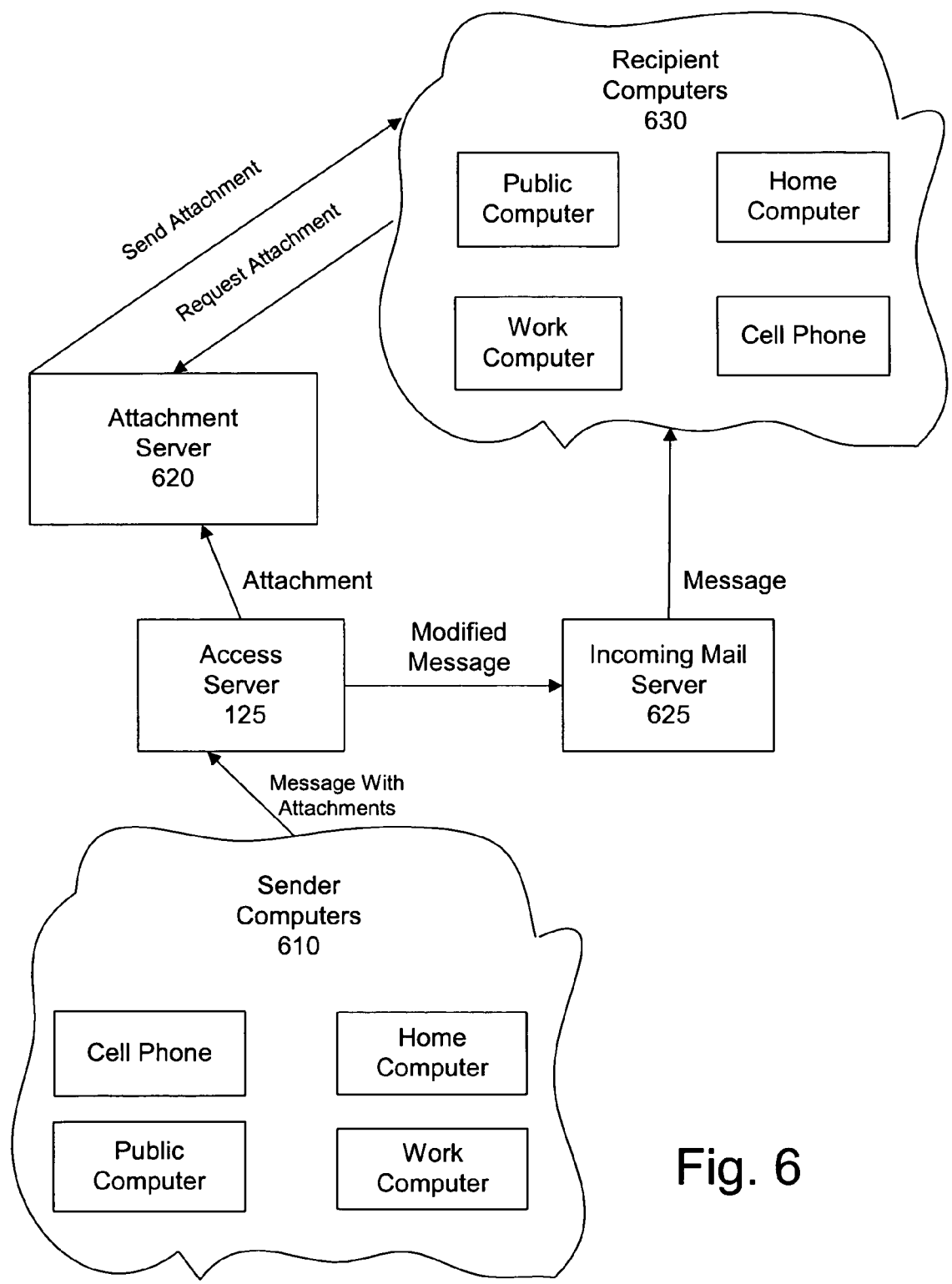
FIG. 6 is block diagram illustrating an overview of the transmission of an electronic mail message through an access server according to one embodiment of the present invention.

FIG. 6 is block diagram illustrating an overview of the transmission of an electronic mail message according to one embodiment of the present invention. A sender computer 610 communicates with an access server to transmit an electronic mail message with a file attachment. In one embodiment the sender computer 610 is a user machine such as a public personal computer, a home computer, a work computer, or a data enabled cell phone from which the user accesses an interface provided by the access server 125 to compose the outgoing message and to add an attachment or attachment reference corresponding to a location on the file sources or the access server itself. In one embodiment, the attachment or attachment reference is selected from a list of recently accessed files presented to the user. When including an attachment location, the user can configure the reference to enable access to a copy of the file or to the original file through the use of the proxy representations discussed in FIG. 1. In an alternate embodiment, the sender computer 610 transmits the message to the access server through an SMTP client located on the sender computer 610.

The access server 125 receives the request to share the attachment files from the sender computer 610. The access server 125 then copies the attachment files to an attachment server 620 or alternatively creates or modifies proxy representations for the attachment files through the process discussed in FIG. 1. The attachment server 620 is a file server which is enabled to receive file sharing requests from the access server 125 and process file transfer requests from message recipients. In some embodiments, the attachment server 620 and the access server 125 are the same system. An email client or outgoing mail server may perform file sharing through the access server according to predetermined criteria or an explicit request from the user. A client on the sender computer can accept a file sharing request provided either beforehand or at the time of sending. An API on the access server can be configured to accept the file sharing request. In one embodiment the attachment server 620 is also configured to perform transduction of file attachments. The attachment server can perform transduction upon receiving the file or when the recipient attempts to download the file. The attachment server 620 can generate a low bandwidth version of a file for ease of access. Additionally, the attachment server 620 can modify attachments stored in less accessible file formats to more commonly used formats for ease of future viewing, stream the file to the recipient, or translate any text in the file.

The access server 125, after transmitting the attachments, embeds links, executables, or data files in the message pointing towards the locations of the attachments stored. The access server 125 may also add tokens or some other security mechanism to the message to ensure that only the recipient can access the attachments stored on the attachment server 620. The access server 125 then transfers the modified message to the incoming mail server 625. While in the present embodiment, the act of separating the attachment and embedding the links, executables, or data files in the message is performed by the access server, in alternate embodiments, it can be performed by the sender computer 610, the incoming mail server 625, an outgoing mail server such as an SMTP or IMAP server, or a proxy server.

The incoming mail server 625 is configured to store messages for retrieval by the recipient computer 630. The incoming mail server 625 can use Point of Presence(POP) protocols, Internet Mail Access Protocol or any other appropriate protocol for electronic mail transfer. In one embodiment, the recipient computer 630 is a public personal computer, a home computer, a work computer, or a data enabled cell phone from which users can retrieve messages, but like the sender computer 610 can also be an internet server that generates a web interface for remote use.

When a user of the recipient computer 630, attempts to access his mail, the recipient computer 630 sends a retrieval request to the incoming mail server 625. The incoming mail server 625 transfers the modified message to the recipient computer 625. The user of the recipient computer 630, upon opening the message selects one of the embedded links, executables, or data files. This causes the recipient computer 630 to send a retrieval request to the attachment server 620. This request may include security credentials necessary to retrieve the message, such as a password, security certificate, or a password. Other criteria may be used such as biometric data, a smart card, or any other identifier.

Validation of the additional security information may be performed by the executable, which then notifies the attachment server that the recipient has been validated or to simply pass along a request after validating the user. This would entail the executable prompting the recipient for validation information. Alternately, the validation can be performed by the attachment server itself, which prompts the user for a password, email address, or other identifier. Additionally, the access server may embed a data file in the message storing information about the location of the attachment and the information necessary to retrieve the attachment. The data file can be utilized by an application stored on the recipient's computer that uses the information stored in the data file to retrieve the attachment. The application can validate the user itself and submit a request to the attachment server, or pass the received validation information to the attachment server.

In some embodiments, the information necessary to securely retrieve the attachment is included in the link, executable, or data file itself. The link can include information such as a password or identifier that would be transmitted to the attachment server when the link is utilized by a browser. Alternately, the link can include an unusual or not easily reproducible location. In the case of an executable, the executable would have validation information such as a password or identifier installed within it, that would automatically be submitted to the attachment server.

The attachment server then transfers the file attachments to the recipient computer 630. If the attachment server 620 is able to perform transduction on the attachment, upon receiving the retrieval request the attachment server 620 can provide the user with a list of options, one being the unmodified version of the file, another being the modified version of the file. Modifications to the file can also include compression of the file, changing the file to a more bandwidth efficient or accessible format, reducing the size or resolution of images, translation of any text in the file, and streaming of media files.

Figure 7:
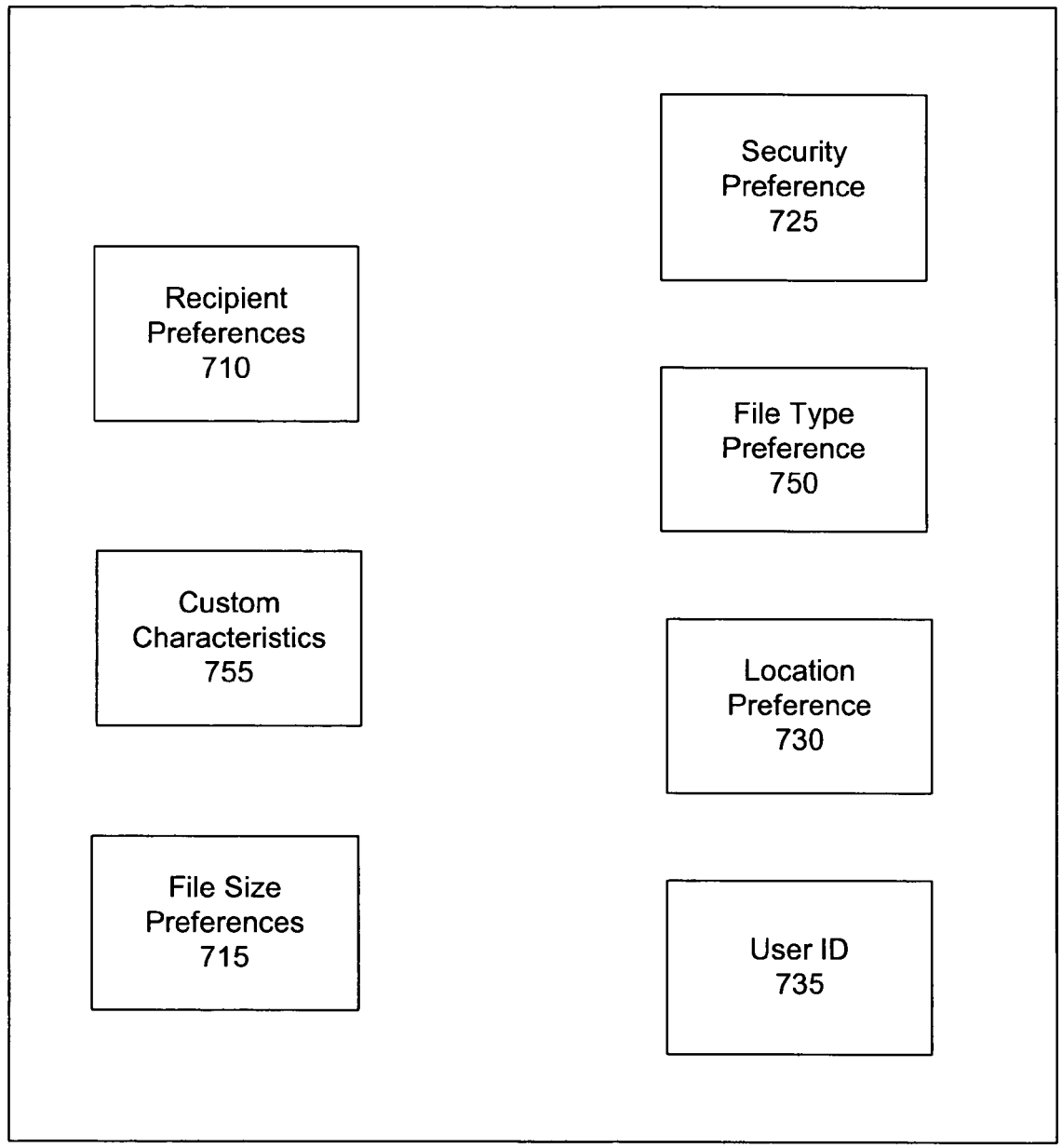
FIG. 7 is a block diagram illustrating one embodiment of a user's electronic mail configuration preferences.

FIG. 7 is a block diagram illustrating one embodiment of an electronic mail configuration file 525 for an access server. In one embodiment, this configuration file is stored in the email preferences 525 of FIG. 5. The configuration file 525 includes a user ID 735 indicating the email address or other identifier associated with the listed preferences. This ID 735 is used by a message parser to determine which set of preferences to apply to a message.

The configuration file 700 also includes recipient preferences 710. These preferences list those users for whom attachments should be separated. For example, if a recipient accessed his mail through a high speed connection and an incoming mail server without a maximum message size, the recipient preferences could indicate that messages sent to the recipient should be unaltered. The recipient preferences 710 can be configured for groups of users or entire domains. For example, all users in a preselected group or having a preselected email address domain could always have their messages modified. The configuration file also includes file size preferences 715. These preferences include a minimum file size necessary for an attachment to be separated from a message. Additionally, the configuration file 700 lists file type preferences 750. These preferences include instructions for which file types, when presented as attachments should be separated from the connected message. The configuration file 700 also includes custom characteristics 755 which include attachment management criteria specified by a user. These custom characteristics 755 can include the employment of mechanisms such as compression for large file attachments.

The configuration file 700 also includes security preferences 725 and location preferences 730. The location preferences 730 indicate preferred servers for storage of separated attachments. The security preferences indicate the levels and mechanism for insuring secure access to the separated files. For example, the security preferences 725 can indicate that a recipient address or an authorized user will be required to access the mail address, or modify the destination URL to cause it to be difficult to reproduce independently.

The varying categories in the configuration file 700 can be cross-linked. Thus the configuration file can indicate that messages having attachment larger than 3 MB should be parsed only when sent to a particular recipient. Alternately, the cross-linked preferences could indicate that all Microsoft Excel spreadsheets should be stored on a particular file server.

Figure 8:
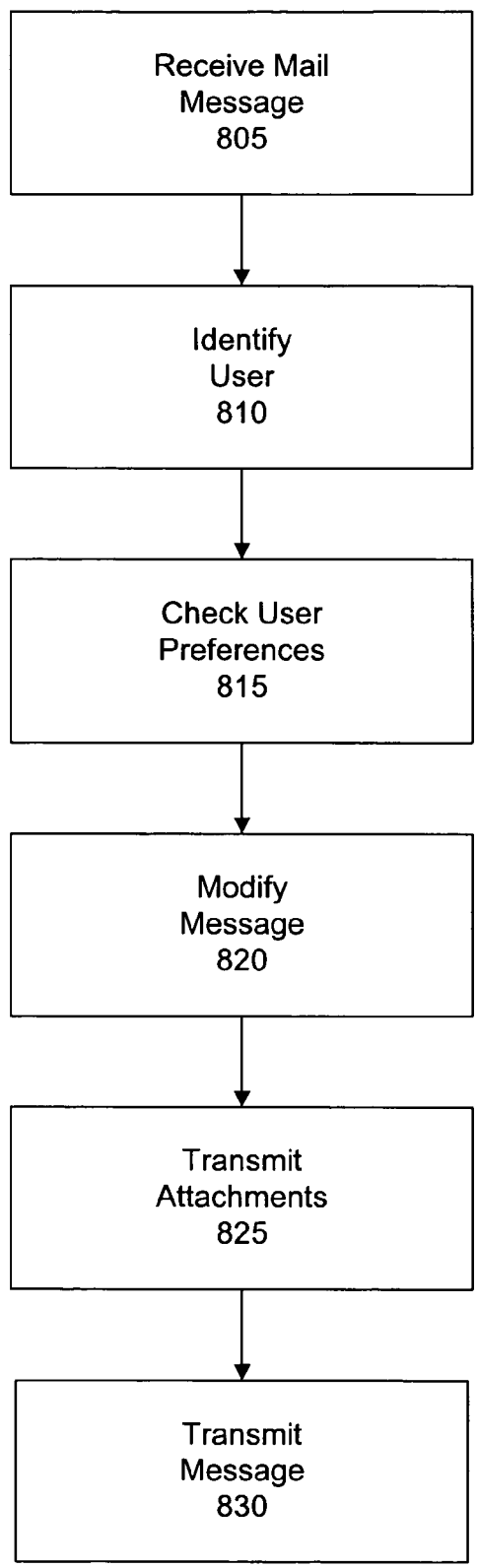
FIG. 8 is a flow chart illustrating a process for transmitting an electronic mail message.

FIG. 8 is a flow chart illustrating a process for receiving and transmitting electronic mail messages. While in the present embodiment, this process is performed by the access server 125, in alternate embodiments, the process can be performed by the sender computer 110, a dedicated outgoing mail server, the incoming mail server, a proxy server, or any other system so equipped.

The process begins with the access server 125 receiving 805 the message from the sender computer 110 either through an SMTP client or a web interface. The message parser 450 then identifies 810 the user who sent the message. This step may involve checking a sender address field of the message or determining an originating Internet Protocol address for the message. The message parser 450 then checks 815 the user preference file 500 associated with the sender of the message to determine the message parsing preferences associated with the sender of the message. Alternately, the access server may perform separation according to an explicit request from the user. A client on the user's system can accept a separation request, either provided beforehand or at the time of sending. An API on the access server can be configured to accept the separation request.

If the access server 125 is unable to identify a user associated with the message, the access server is configured to extract a generic profile for parsing incoming messages.

The message parser 450 then modifies the message according to the rules listed in the user's preference file 500. In an alternate embodiment, the message parser 450 checks rules embedded in the message itself in order to make modification decisions or receives direction from the sender computer via an API call. The message may include whether it should be modified, when it should be modified, and whether server side transduction should be performed. The message parser utilizes the attachment reference module 440 and the security module 345 to provide links, executables, or data files or receive them from the attachment server and to direct the attachment server to install security measures for the file attachment. The message parser 450 then transmits 825 any separated attachments to the attachment server 120. If the rules listed in the user's preference file 500 do not indicate that attachments should be separated, or if the message does not include attachments, no attachments are sent. The message parser 450 then transmits 830 the message to the incoming mail server 125.

Figure 9:
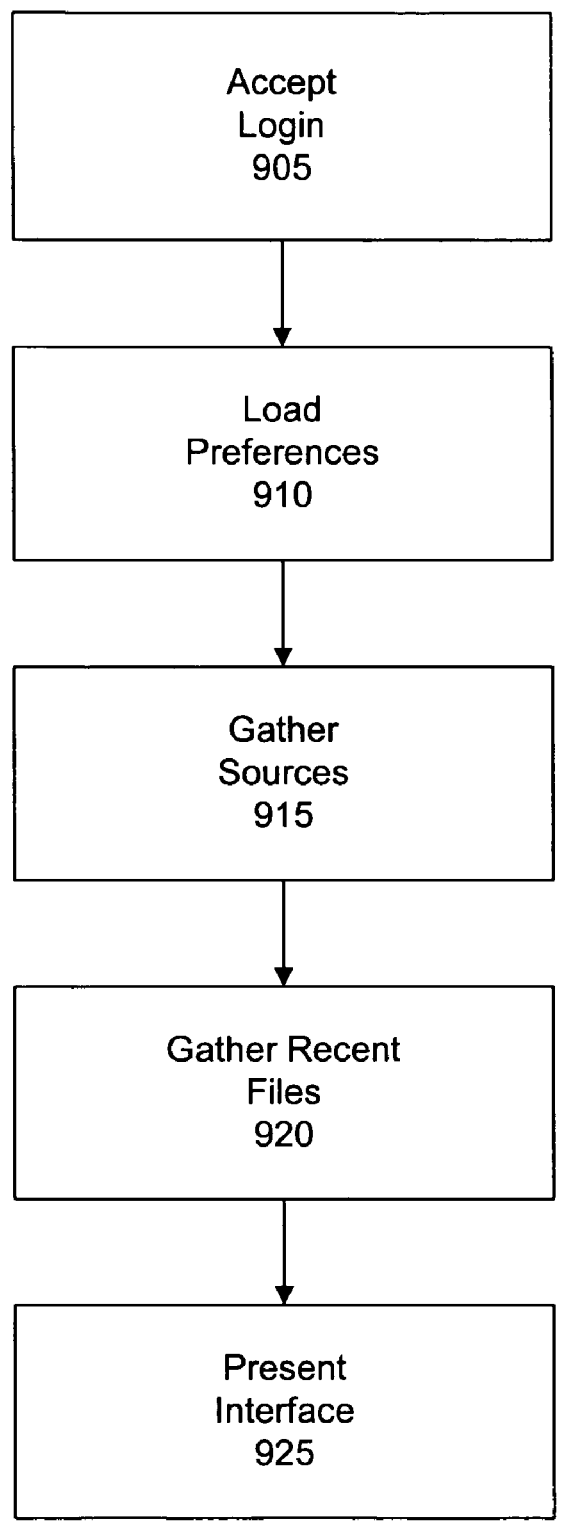
FIG. 9 is a flow chart illustrating an overview of a user's interaction with an access server.

FIG. 9 is a flow chart illustrating an overview of a user's interaction with an access server. The process begins with a user submitting login information. Upon receiving the user login, the access server 125 searches the user identification 525 sections of each user record 500 until it finds a user ID corresponding with the submitted login information. The access server 125 then loads 910 the preferences associated with the submitted username. The access server then logs 915 into all sources associated with the submitted username and password. The access server 125 then gathers 920 recent files from each of the file sources, and presents 925 an interface of the kind illustrated in FIG. 1A.

Figure 10:
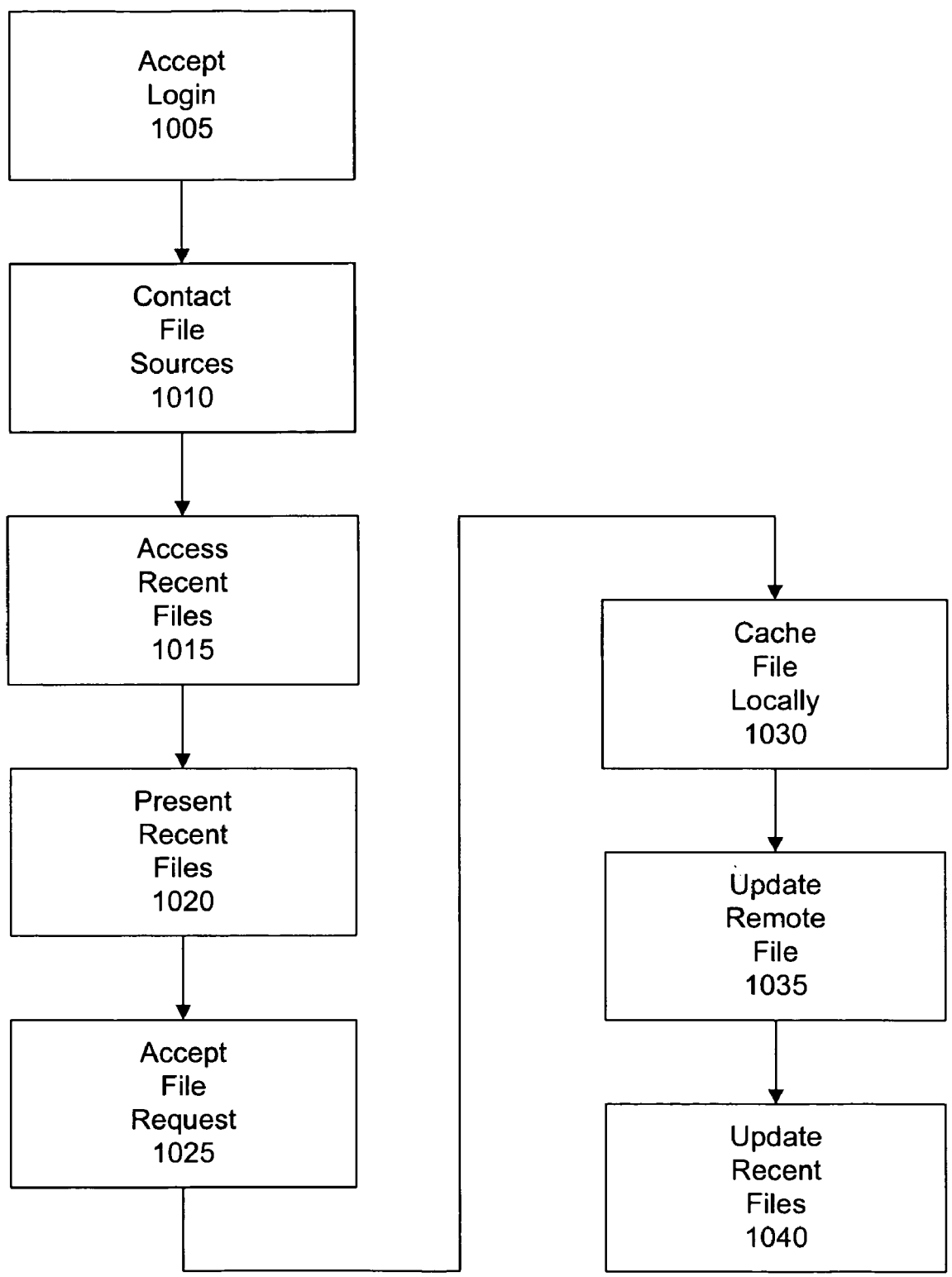
FIG. 10 is a block diagram illustrating one embodiment of a process for generating a list of recently accessed files.

FIG. 10 is a flow chart illustrating one embodiment of a method for retrieving and editing a file stored on a remote file source 140. It should be noted that the functions performed in this figure can be shifted between the client 110, access sever 125, or file sources 140, 145, 150. For example, the file sources may include a file source wrapper which gathers information about files stored on the file source and passes it to the access server. Alternately, the clients may perform filtering operations on recent file lists passed from the access server. The process begins with the access server accepting 1005 a user login via the client interface 415. Upon receiving the user login, the access server 125 searches the user identification 525 sections of each user record 500 until it finds a user ID corresponding with the submitted login information.

The access server 125 then reads the source information 510 and contacts each of the sources 140, 145, 150. If the user record 500 includes the login and password information for each of the sources, the access server extracts it. For any sources for which the login information is not present, the access server 125 prompts the user to provide username and password information. The file source interface 410 uses the source information 510 to manage its interaction with the file sources 140, 145, 150. The file selection generator 430 then accesses 1015 the recent files from each of the sources. In one embodiment, the file selection generator 430, through the file source interface 410 contacts each of the sources to receive lists of the most recently used files 345. The file selection generator 430 can draw a single list of the most recently accessed files. Alternatively, the file selection generator 410 can extract a separate list of the most recently used files for each of a number of commonly used applications. The file selection generator 430 is configured to check the client interface for a list of applications accessible by the user and present recently used files for each of those applications. For operating systems that lack recent file histories, the file selection generator 430 sorts all of the files accessible to the user and accepts those having the latest access date as the most recent files. For those file sources 140 that maintain file source wrappers 328, the file selection generator contacts the file source wrapper 328 and obtains the recent file information. The file selection generator may also check shared files 168 stored on the access server 125 and file sources 140, 145, 150 and include these files in the list of recent files. For users that do not have file sources associated with their account on the access server, the list will include only files shared by other users.

The file source wrapper, access server, or client may filter the files according to the viewing capacities of the clients or other criteria. This filtering can include filtering by file type, file size, by time accessed, or any other relevant criteria.

The client interface 415 then presents 1020 the user with links to the most recently accessed files. In one embodiment, the client interface provides a list of recently accessed files as part of a startup screen without additional prompting or requests. As used herein the term "link" refers to a graphical icon or text grouping that when selected via the user interface causes a document or folder to be accessed. In one embodiment, the client interface 415 also provides navigational links for accessing folders and drives on the file sources 140, 145, 150.

A user then selects a file through the client interface 415, which receives 1025 the file request and retrieves the file from the file source 140. The access server 125 then caches the file locally in the file cache 425 so that it can be edited. The client system 110 may also cache a copy of the file locally. Once the file has been updated and the user submits a command to save the file, the cached file is copied 1035 to the file source 140, which then updates the file in the remote directory.

While the present embodiment discusses editing the files, the user can also share copies or original versions of the files or route the files to external sources such as printers, fax services, multifunction devices, electronic whiteboards, or any other service associated with the access server 125.

The file selection generator 430 then updates 1040 the recent file list 520 of the user to indicate that the accessed file is a recently used file. If the file was originally selected from the recent file list 520, the file selection generator 430 places the file at a higher level of recency. If the file was not originally on the recent file list 520, it is added to the list as the most recently used file.

Figure 11:
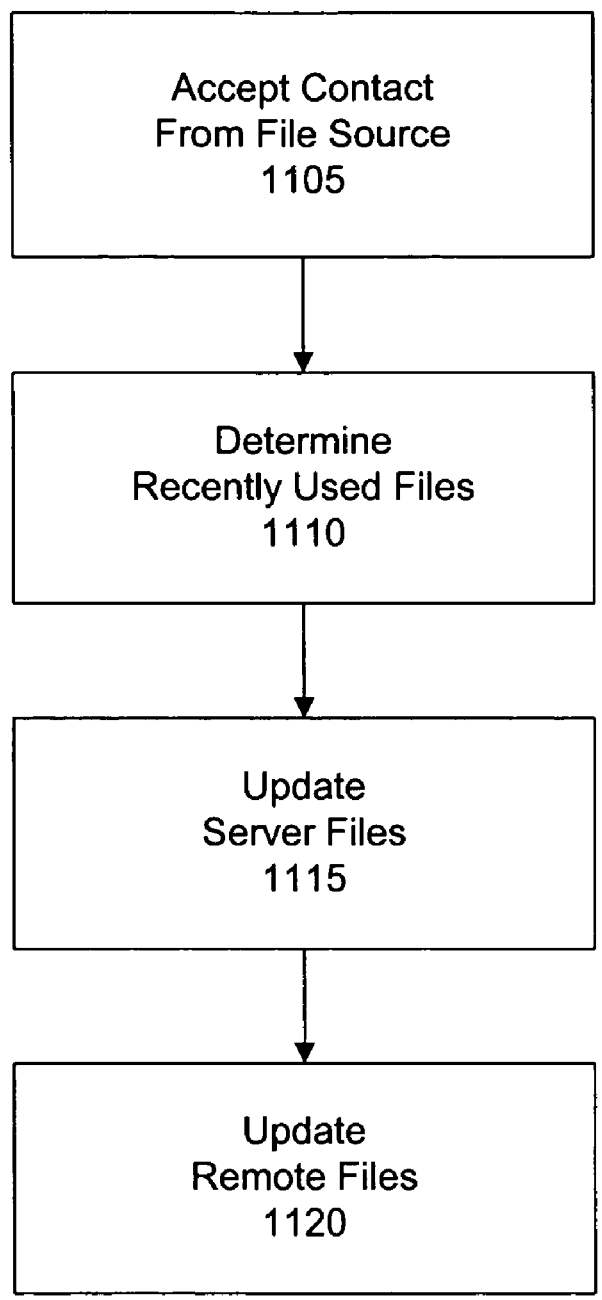
FIG. 11 is a flow chart illustrating a method for updating files on remote file sources.

FIG. 11 is a flow chart illustrating a method for updating files on remote file sources that only contact the access server periodically. The process begins with the access server accepting a contact attempt from a file source 140. The access server 125 then determines 1110 which files have recently been changed on the file source 140 and which files associated with the file source 140 have had their cached versions modified on the access server 125. The access server 125 then updates 1115 the cached versions of the files on the server that are older than their corresponding files on the file source 140. Finally, the access server 125 contacts the file source 140 and updates those files on the file source 140 that are older than their cached versions on the access server.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed is:

1. A method for managing access to files and sharing of files between users from remote client devices, the method comprising:
    receiving an identifier from a first user of a first client device to an access server, the access server located behind a firewall in a network;
    determining a remote file source associated with the identifier, the remote file source being part of the network;
    generating a list of recently used files associated with the file source and the identifier, the recently used files having been accessed previously by the first user of the first client device;
    presenting an interface enabling access to the list of recently used files by using the first client device;
    receiving, from the first user of the first client device, a request to share a file from the list with a second user at a second client device wherein the second user and second client device are outside of the firewall of the network of the remote file source and the access server;
    generating a proxy representation of the file on the access server, the proxy representation including a file identifier and a set of credentials for the first user that initiated the request to share the file;
    transmitting a link to the second user of the second client device in response to the request to share the file, wherein the link references at least one of: a cached copy of the file stored on the access server and the file identified by the file identifier; and
    accessing the link by the second user of the second client device wherein the accessing causes the access server to provide access to the cached copy of the file if the cached copy is stored on the access server, otherwise provide access directly to the file identified by the file identifier by using the credentials for the first user.

2. The method of claim 1, further comprising configuring the interface for the viewing capacity of the first client device in order to enable access to said recently used file by the user of said second client device.

3. The method of claim 2, wherein the first client device is a laptop computer.

4. The method of claim 2, wherein the first client device is a personal data assistant.

5. The method of claim 2, wherein the first client device is a cellular telephone.

6. The method of claim 1, wherein generating the list of at least one recently accessed file comprises receiving a list of at least one recently accessed file on the file source.

7. The method of claim 1, wherein generating the list of at least one recently accessed file comprises:
    reading a time of last access for files stored on the file source; and
    selecting a file according to its time of last access.

8. The method of claim 1, wherein generating the list of at least one recently accessed file comprises:
    determining an application available to the first user; and
    receiving from the file source a list of at least one file associated with the application.

9. The method of claim 1, wherein the access server uses the credentials of said first user stored in the proxy representation to retrieve the file from the file source.

10. The method of claim 1, further comprising:
    receiving one or more changes to said file from the second user; and
    logging into the file source by the access server by using the credentials of the first user in the proxy representation and modifying an original version of the file stored in the file source to reflect the one or more changes made by the second user.

11. The method of claim 1, wherein the proxy representation of the file at the access server further includes:
    an identifier for the file source on which the file is stored;
    a path and filename of said file on the file source;
    a permissions indicator listing an identifier of the second user and a level of access granted to said second user; and
    a location of said cached copy of the file.

12. The method of claim 1 wherein the access server registers the second user prior to enabling access to the file.

13. A computer program product, stored on a computer readable medium, and including computer executable instructions for controlling a processor to manage access to remote files and manage sharing of files between remote users, wherein the instructions, when executed by said processor, will carry out the steps of:
    receiving an identifier from a first user of a first client device to an access server, the access server located behind a firewall in a network;
    determining a remote file source associated with the identifier, the remote file source being part of the network;
    generating a list of recently used files associated with the file source and the identifier the recently used files having been accessed previously by the first user of the first client device;
    presenting an interface enabling access to the list of recently used files by using the first client device;
    receiving, from the first user of the first client device, a request to share a file from the list with a second user at a second client device wherein the second user and second client device are outside of the firewall of the network of the remote file source and the access server;
    generating a proxy representation of the file on the access server, the proxy representation including a file identifier and credentials for the first user;
    transmitting a link to the second user of the second client device in response to the request to share the file, wherein the link references at least one of: a cached copy of the file stored on the access server or the file identified by the file identifier; and accessing the link by the second user of the second client device wherein the accessing causes the access server to provide access to the cached copy of the file if the cached copy is stored on the access server, otherwise provide access directly to the file identified by the file identifier by using the credentials for the first user.

14. The computer program product of claim 13, wherein the instructions further comprise configuring the interface for the viewing capacity of the first client device in order to enable access to said recently used file by the first user of said first client device.

15. The computer program product of claim 14, wherein the first client device is a laptop computer.

16. The computer program product of claim 14, wherein the first client device is a personal data assistant.

17. The computer program product of claim 14, wherein the first client device is a cellular telephone.

18. The computer program product of claim 13, wherein generating the list of at least one recently accessed file comprises receiving a list of at least one recently accessed file on the file source.

19. The computer program product of claim 13, wherein generating the list of at least one recently accessed file comprises:
   reading a time of last access for files stored on the file source; and
   selecting a file according to its time of last access.

20. The computer program product of claim 13, wherein generating the list of at least one recently accessed file comprises:
   determining an application available to the user and;
   receiving from the file source a list of at least one file associated with the application.

21. A method for transmitting electronic mail messages and sharing files between remote users, the method comprising:
   establishing a connection between an access server and a remote client device;
   determining a plurality of remote file sources associated with a user of the remote client device and logging into each of the plurality of remote file sources by the access server;
   retrieving a set of files recently accessed by the user from the plurality of remote file sources and generating a unified list of recently accessed files;
   generating an electronic mail message interface and providing the electronic mail message interface to the user of the remote client device, wherein the electronic mail message interface includes the unified list of recently accessed files;
   configuring the electronic mail message interface for the remote client device by the access server;
   accepting a message from the remote client device by using the electronic mail message interface, wherein the message includes a file from the unified list as an attachment, the file located on one of the remote file sources;
   generating a proxy representation of the file in a shared location on the access server, the proxy representation containing credentials for the user;
   inserting in the message a hyperlink associated with the shared location;
   transmitting the message to a remote recipient; and
   accessing the hyperlink by the remote recipient wherein the accessing causes the access server to provide access directly to the file by the access server logging into the remote file source using the credentials in the proxy representation such that the recipient is enabled to modify the file on the remote file source.

22. The method of claim 21, wherein inserting the hyperlink in the message further includes adding a security token to the electronic mail message in order to ensure that only the recipient of said electronic mail message can access the cached copy in said shared location.

23. The method of claim 21, wherein the remote client device is a laptop computer.

24. The method of claim 21, wherein the remote client device is a personal data assistant.

25. The method of claim 21, wherein the remote client device is a cellular phone.

26. The method of claim 21, further comprising transmitting the message to the remote recipient by said access server.

27. A computer program product, stored on a computer readable medium, and including computer executable instructions for controlling a processor to transmit electronic mail messages and sharing files between remote users, wherein the instructions when executed by said processor, will carry out the steps comprising:
   establishing a connection between an access server and a remote client device;
   determining a plurality of remote file sources associated with a user of the remote client device and logging into each of the plurality of remote file sources by the access server;
   retrieving a set of files recently accessed by the user from the plurality of remote file sources and generating a unified list of recently accessed files;
   generating an electronic mail message interface and providing the electronic mail message interface to the user of the remote client device, wherein the electronic mail message interface includes the unified list of recently accessed files;
   configuring the electronic mail message interface for the remote client device of the access server;
   accepting a message from the remote client device by using the electronic mail message interface, wherein the message includes a file from the list as an attachment, the file located on one of the remote file sources;
   generating a proxy representation of the file in a shared location on the access server, the proxy representation containing credentials for the user;
   inserting in the message a hyperlink associated with the shared location;
   transmitting the message to a remote recipient; and
   accessing the hyperlink by the remote recipient wherein the accessing causes the access server to provide access directly to the file by the access server logging into the remote file source using the credentials in the proxy representation such that the recipient is enabled to modify the file on the remote file source.

28. The computer program product of claim 27, wherein the instructions for inserting the hyperlink in the message further include instructions for adding a security token to the message in order to ensure that only the remote recipient of said message can access the file in said shared location.

29. The computer program product of claim 27, further comprising:
   copying the file to a remote location;
   wherein the hyperlink is associated with the remote location.

30. The computer program product of claim 27, wherein the remote client device is a personal data assistant.

31. The computer program product of claim 27, wherein the remote client device is a cellular phone.

32. The computer program product of claim 27, wherein the hyperlink is associated with the file location.

33. A system for managing access to files and sharing access to files between remote users, said system comprising:
an access server that receives an identifier from a first user, determines a remote file source associated with the identifier and generates a list of recently used files associated with the file source and the identifier, the recently used files having been previously accessed by the user;
a first client device that connects to the access server and allows the first user access to the list of recently used files generated by the access server; and
a second client device having a second user;
wherein the access server receives, from the first user, a request to share a file from the list with the second user at the second client device wherein the first client device and the second client device are outside of a firewall of a network of the remote file source;
wherein the access server generates a proxy representation of the file that includes a file identifier and credentials for the first user;
wherein a link is transmitted to the second user of the second client device in response to the request to share the file, wherein the link references at least one of: a cached copy of the file stored on the access server or the file identified by the file identifier; and
wherein the link is accessed by the second user of the second client device wherein the accessing causes the access server to provide access to the cached copy of the file if the cached copy is stored on the access server, otherwise provide access directly to the file identified by the file identifier by using the credentials for the first user.

34. The system of claim 33, wherein the access server uses the credentials of said first user stored in the proxy representation to retrieve the file from the file source.

35. The system of claim 33 wherein the access server receives one or more changes to said file from the second user and logs into the file source by using the credentials of the first user in the proxy representation and modifies an original version of the file stored in the file source to reflect the one or more changes made by the second user.

36. The system of claim 33, wherein the proxy representation of the file at the access server further includes:
an identifier for the file source on which the file is stored;
a path and filename of said file on the file source;
a permissions indicator listing an identifier of the second user and a level of access granted to said second user; and
a location of said cached copy of the file.

37. The system of claim 33 wherein the access server registers the second user prior to enabling access to the file.

38. The system of claim 33 wherein the first client device is a laptop computer.

39. The system of claim 33 wherein the first client device is a cellular phone.

40. The system of claim 33 wherein the first client device is a personal digital assistant.

41. A system for managing access to files and sharing access to files by remote users, said system comprising:
an access server that receives an identifier from a first user, determines a plurality of remote file sources associated with the identifier and generates a single unified list of recently used files associated with the identifier by automatically logging into each of the plurality of file sources on behalf of the first user;
a first client device that connects to the access server and allows the first user access to the unified list of recently used files generated by the access server; and
a second client device having a second user;
wherein the access server receives, from the first user, a request to share a file from the unified list with the second user at the second client device wherein the first client and the second client device are outside of a firewall of a network of the remote file source;
wherein the access server generates a proxy representation of the file that includes a file identifier and credentials for the first user;
wherein a link is transmitted to the second user of the second client device in response to the request to share the file, wherein the link references at least one of: a cached copy of the file stored on the access server or the file identified by the file identifier; and
wherein the link is accessed by the second user of the second client device wherein the accessing causes the access server to provide access to the cached copy of the file if the cached copy is stored on the access server, otherwise provide access directly to the file identified by the file identifier by using the credentials for the first user.

42. The system of claim 41, wherein the access server uses the credentials of said first user stored in the proxy representation to retrieve the file from the file source.

43. The system of claim 41 wherein the access server receives one or more changes to said file from the second user and logs into the file source by using the credentials of the first user in the proxy representation and modifies an original version of the file stored in the file source to reflect the one or more changes made by the second user.

44. The system of claim 41, wherein the proxy representation of the file at the access server further includes:
an identifier for the file source on which the file is stored;
a path and filename of said file on the file source;
a permissions indicator listing an identifier of the second user and a level of access granted to said second user; and
a location of said cached copy of the file.

45. The system of claim 41 wherein the access server registers the second user prior to enabling access to the file.

46. The system of claim 41 wherein the first client device is a laptop computer.

47. The system of claim 41 wherein the first client device is a cellular phone.

48. The system of claim 41 wherein the first client device is a personal digital assistant.

49. A system for transmitting electronic mail messages and sharing files between remote users, said system comprising:
an access server that determines a plurality of remote file sources associated with a user, automatically logs into each of the plurality of remote file sources and retrieves a unified list of recently accessed files by the user;
a remote client device having an electronic mail message interface provided to the user, wherein the electronic mail message interface includes the unified list of recently accessed files;
wherein the electronic mail message interface accepts a message including a file from the unified list as an attachment to the message, the file located on one of the remote file sources;
wherein the access server generates a proxy that contains credentials for the user;

wherein the access server inserts in the message a hyperlink associated with the proxy and wherein the message is transmitted to a remote recipient;

wherein the hyperlink is accessed by the remote recipient, the accessing of the hyperlink causing the access server to provide access directly to the file in the remote file source by using the credentials in the proxy such that the remote recipient is enabled to modify the file on the remote file source.

50. The system of claim 49 wherein the access server receives one or more changes from the remote recipient accessing the link and logs into the file location by using credentials of the user and modifies an original version of the file stored in a file location to reflect the one or more changes made by the remote recipient.

51. The system of claim 49 wherein the access server registers the remote recipient prior to enabling access to the file.

52. The system of claim 49 wherein the remote client device is a laptop computer.

53. The system of claim 49 wherein the remote client device is a cellular phone.

54. The system of claim 49 wherein the remote client device is a personal digital assistant.

* * * * *